(12) United States Patent
Becker

(10) Patent No.: US 6,416,017 B1
(45) Date of Patent: Jul. 9, 2002

(54) SYSTEM AND METHOD FOR COMPENSATING STRUCTURAL VIBRATIONS OF AN AIRCRAFT CAUSED BY OUTSIDE DISTURBANCES

(75) Inventor: Juergen Becker, Munich (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/554,245

(22) PCT Filed: Sep. 2, 1999

(86) PCT No.: PCT/DE99/02773

§ 371 (c)(1),
(2), (4) Date: May 11, 2000

(87) PCT Pub. No.: WO00/15498

PCT Pub. Date: Mar. 23, 2000

(30) Foreign Application Priority Data

Sep. 11, 1998 (DE) .......................................... 198 41 632

(51) Int. Cl.$^7$ ............................................... B64C 13/16
(52) U.S. Cl. ...................... 244/76 C; 244/203; 244/194
(58) Field of Search .............................. 244/76 C, 177, 244/194, 203

(56) References Cited

U.S. PATENT DOCUMENTS

| 2,985,409 | A | * | 5/1961 | Atwood et al. | ........ 244/76 C X |
| 3,279,725 | A | * | 10/1966 | Andrew et al. | ........ 244/76 C X |
| 3,734,432 | A | | 5/1973 | Low | ...................... 244/76 C X |
| 4,706,902 | A | | 11/1987 | Destuynder et al. | ...... 244/76 C |
| 4,725,020 | A | | 2/1988 | Whitener | |
| 4,905,934 | A | | 3/1990 | Chin | ........................ 244/76 C |
| 5,072,893 | A | | 12/1991 | Chakravarty et al. | |
| 5,082,207 | A | * | 1/1992 | Tulinius | ................. 244/203 X |
| 5,186,416 | A | | 2/1993 | Fabre et al. | |

* cited by examiner

Primary Examiner—Robert P. Swiatek
(74) Attorney, Agent, or Firm—Crowell & Moring LLP

(57) ABSTRACT

Method for compensating structural vibrations of an aircraft caused by wind blasts and buffeting in an aircraft in flight includes the steps of: detecting the structural vibrations by measurement technology using roll rates determined in an inertial sensing system, supplying the determined disturbing values to a flight control system, producing phase- and amplitude-correct control flap movements by generating appropriate control signals in respective control drives to counteract the phases and amplitudes of the excited vibrations.

10 Claims, 1 Drawing Sheet

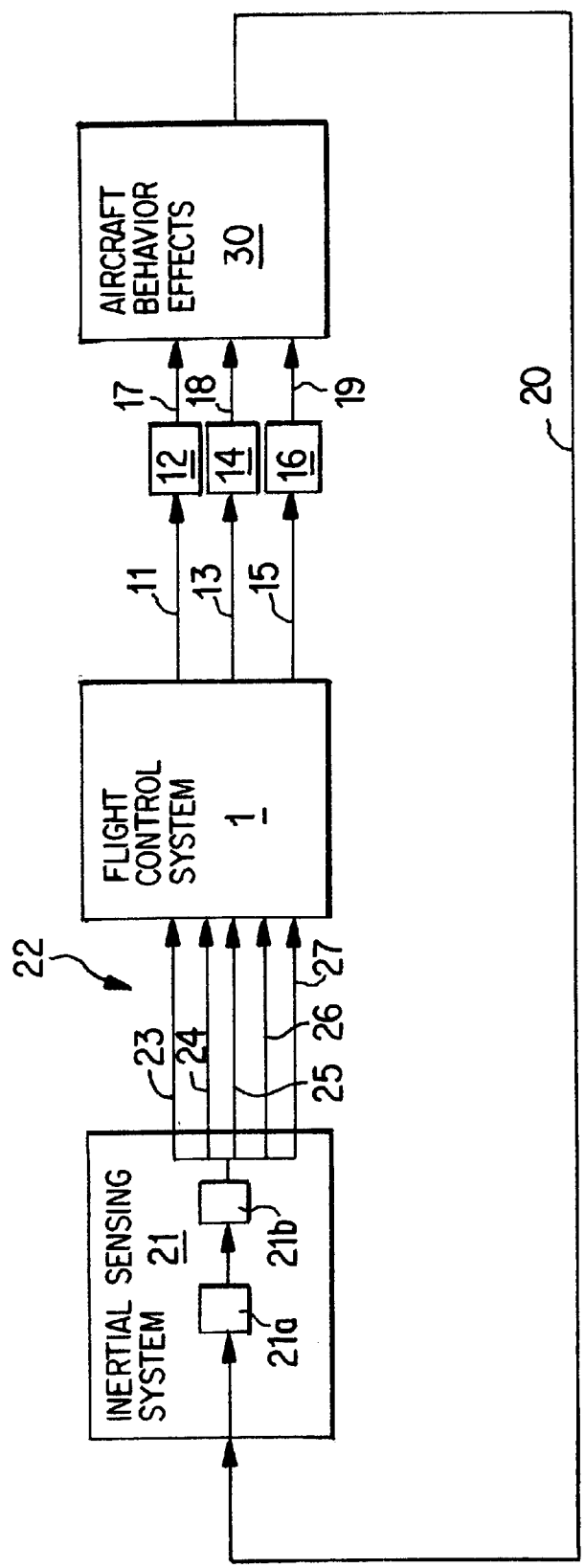
Figure

SYSTEM AND METHOD FOR COMPENSATING STRUCTURAL VIBRATIONS OF AN AIRCRAFT CAUSED BY OUTSIDE DISTURBANCES

BACKGROUND AND SUMMARY OF THE INVENTION

The invention relates to a method for compensating structural vibrations of an aircraft caused by external influences, especially wind gusts, turbulence, and buffeting, in particular compensating structural vibrations of a manned fixed-wing aircraft, a missile, or a helicopter, as well as a system for performing this method.

Another viewpoint of the invention is the so-called buffeting or "shaking," in other words the response of the behavior of the aircraft as a result of separated air flow ("buffet") and vortices at high angles of attack. The dynamic loads from the process of separated flow are high and result in design criteria for the wings and empennage of aircraft, especially manned fighter aircraft. Weakening of the effects of these disturbances is therefore very important in designing aircraft and in increasing and monitoring the load limits of aircraft.

The behavior of an aircraft in flight in a turbulent atmosphere should be as calm as possible, but should lie at least in the range of known rules. This is especially true of passenger aircraft for which there are special requirements regarding passenger comfort, also called "ride comfort." External disturbances, especially wind blasts and turbulence, act directly on structural parts of the aircraft which are excited to vibrate as a result of the shapes of the structures. Because of this effect, the behavior during flight, and especially the comfort of the passengers and pilots, are unfavorably influenced and the structure of the aircraft is subjected to loads.

Thus far, to reduce the effects of such external atmospheric disturbances on the aircraft, sensor devices, especially acceleration sensors, have been mounted at various locations on the aircraft. Preferably, acceleration sensors were placed at the tips of the wings, on the fuselage, and at the tips of the vertical and horizontal stabilizers. The sensor signals are processed in a controller and considered in determining the adjustments of the drives of the rudder surfaces. Such systems are described for example in "Proceedings of the 26th Aircraft Symposium," Sendai, Japan, October 19–21, "Japan Publications Trading Company," Tokyo, 1988, pages 160–163 or in "DGLR Paper" 084–094 of the Deutsche Gesellschaft für Luft- und Raumfahrt, Annual Meeting, Oct. 1–3, 1984, Hamburg.

One disadvantage of these sensor devices or systems is that the cost of measurement technology and the expense for regulating and adjusting devices is very high. Especially in controlled aircraft, the cost is further increased by the fact that in the event of an error in such sensor devices, appropriate error recognition and system reconfiguration functions must be provided to at least limit the effects of such errors or to compensate for them.

In addition, methods and systems for compensating disturbances in aircraft structures are known from U.S. Pat. Nos. 4,905,934, 5,072,893, 5,186,416, and 4,725,020. These patents are intended to reduce the loads on the structure caused by these disturbances. Acceleration signals or these signals combined with stress values and attack angles are used to move the control surfaces of the aircraft so that the load distribution in the structure is reduced. Higher frequency forms of vibration and structural couplings are not compensated however. Phase delays, which play an important role particularly at higher frequency vibrations, are not taken into account so that the method according to the prior art is suitable only for very low frequencies.

Hence, the goal of the present invention is to provide a method and device for compensating structural vibrations of an aircraft caused by wind gusts and buffeting that is also suitable for compensating higher frequency vibrations.

This goal is achieved by a method for compensating structural vibrations of an aircraft caused by wind blasts and buffeting on the aircraft in flight, the method including the steps of: (1) detecting structural vibrations by measurement technology using roll rates determined in an inertial sensing system; (2) feeding the disturbing parameters detected to a flight control system; and (3) producing phase- and amplitude-correct control flap movements by generating appropriate control signals at the respective drives to counteract the phases and amplitudes of the excited vibrations. A device for performing the method is also provided. Additional embodiments are described herein.

In the method according to the invention or the device according to the invention, the cost of the equipment is extremely low and, depending on the flight control system in question, comprises additional connections between the inertial sensing system of the flight control system and the actual flight control systems. In addition, there is a functional cost for in-phase processing of the values fed back from the inertial sensing system for damping the behavior in flight. This expense is much greater in the method according to the prior art because devices must be provided to supply the signals of the acceleration sensors in-phase and to monitor them. If it is assumed that an inertial sensing system and a flight control system are already aboard the aircraft in question, a flight control system is only functional in feeding back additional values from the inertial sensing system for damping the behavior of the aircraft in flight.

Surprisingly, it has been found that the effects of atmospheric disturbances on an aircraft in flight can essentially be detected with only the roll rates from an inertial sensing system designed for a flight control system and that these effects can be damped by appropriately supplying and processing these values in the flight control system.

BRIEF DESCRIPTION OF THE DRAWING

The invention will now be described with reference to the FIGURE that shows a block diagram of a closed regulating circuit with a flight control system, control drives, and an inertial sensing system.

DETAILED DESCRIPTION OF THE DRAWING

The FIGURE shows an electronic flight control system 1 connected by at least one data connection 11 with one or more control drives 12 for the horizontal stabilizer, with a data connection 13 with control drives 14 for ailerons, and with a data connection 15 for the drives 16 of the vertical stabilizer (rudder). The data connections 11, 13, 15 in turn can comprise a plurality of electrical analog or digital lines. The effects of the control drives 12, 14, 16 on aircraft behavior represented symbolically by function block 30 are likewise displayed symbolically with connecting lines 17, 18, and 19.

The aircraft behavior 30 is detected by an inertial sensing system 21 connected with the electronic flight control system 1, with the inertial sensing system being represented symbolically and being coupled by connecting line 20.

Inertial sensing system 21 in turn is connected by analog signal lines or digital data connections 22 with electronic flight control system 1. In the present invention, only the connection for vertical acceleration 23, the pitch rate 24, lateral acceleration 25, roll rate 26, and yaw rate 27 are shown in the present invention as signal or data connections 22. For purposes of the invention, the angular rates are essential.

These values are determined by inertial sensing system 21 and consolidated (21a) there or in the electronic flight control system. Both the inertial sensors 21 and the electronic flight control system 1 preferably have a plurality of redundant and similar or dissimilar components (21b) that exchange data with one another to identify and to recognize the appearance of errors and to guarantee suitable reconfiguration mechanisms for maintaining all of the flight control functions. The functions of the inertial sensing system 21, which are connected functionally downstream of the actual inertial sensor components (also not shown), are integrated with the functions of electronic flight control system 1 in a data processing device or they are functionally separate from them. The signal and data connections 22 can therefore also be in the form of software.

According to the invention, for damping the lengthwise movement of the aircraft, the pitch rate 24 is fed to flight control system 1. Following processing therein, they are taken into account in the control signal for those control drives which, depending on the aircraft configuration, are responsible for influencing the lengthwise movement of the aircraft. In most fixed-wing aircraft, this is the vertical stabilizer control drive 14.

For damping aircraft behavior especially during lateral movement, the values determined in inertial sensing system 21 for roll rate 26, or yaw rate 27 (or a combination of two of these values) are supplied to electronic flight control system 1. Here, these values are processed and taken into account in the control signals for the drives responsible for the lateral movement of the aircraft for damping interference. This takes place in most fixed-wing aircraft through suitable lines 13, 15 by means of the aileron drive 14 and the rudder drive 16.

Depending on the type of aircraft, a plurality of drives are preferably supplied for each elevator provided on the aircraft. This is also true for the ailerons, the rudders, or other control surfaces of the aircraft depending on the configuration of the aircraft together with a control drive. In suitable fashion and also as a function of the safety concept of flight control system 1, one or more data or signal connections 11 is/are provided for each drive 12. Signal or data processing can also be associated with each control drive 12 provided either physically on the control drive or at a distance from it in the aircraft. The same is true of the drives of other control surfaces of the aircraft and their corresponding signal and data connections.

The data 23, 24, 25, 26, and/or 27 supplied by the inertial sensing system 21 to flight control system 1 are filtered in flight control system 1 preferably in filter stages (also not shown), including avoiding the excitation of eigen frequencies of the aircraft structure by drives 12, 14, 16. To control the aircraft, the latter, other sensor data, and stored data are processed with one another using control technology. Relative to the damping of atmospheric disturbances, the data provided for this purpose 23, 24, 25, 26, and/or 27 are compared with the values of these data in previous calculation cycles and the resultant phase differences are transmitted following suitable amplification as control signals over lines 11, 13, and 15 to drives 12, 14, and 16. These produce corresponding deflections of the control flaps that counteract the atmospheric disturbances on the aircraft. Damping of the disturbances acting on the aircraft is achieved when data 23, 24, 25, 26, and/or 27 are processed in-phase in the aircraft control system. Then, by means of appropriate control signals, the effects of atmospheric disturbances on the aircraft relative to the high-frequency shapes of the aircraft structure are reduced as a damping action.

The entire system from the inertial sensing system 21 through the flight control system 1 and the control drives 12, 14, and 16 must be sufficiently fast, in other words they must exhibit a suitably slow phase shift and the control drives 12, 14, and 16 must have a suitable response performance and especially control rates in order to produce a sufficiently rapid movement of the control flaps of the aircraft and to achieve timely damping of the effects of disturbances on the aircraft.

What is claimed is:

1. A method for compensating structural vibrations of an aircraft caused by external disturbances acting on the aircraft in flight, the method comprising the acts of:

detecting the structural vibrations via measurement technology using roll rates determined essentially by an inertial sensing system of the aircraft without requiring additional sensors;

feeding disturbing parameters of the detected structural vibrations to a flight control system of the aircraft; and producing phase- and amplitude-correct control flap movements of the aircraft by generating appropriate control signals at respective drives to counteract phases and amplitudes of excited structural vibrations.

2. The method according to claim 1, further comprising the act of additionally utilizing yaw rates measured by the inertial sensing system to produce control flap movements.

3. The method according to claim 2, further comprising the act of additionally using pitch rates measured by the inertial sensing system to generate control flap movements.

4. The method according to claim 1, further comprising the act of additionally using pitch rates measured by the inertial sensing system to generate control flap movements.

5. A method according to claim 1, wherein the external disturbances are wind blasts and buffeting on the aircraft.

6. A system for compensating structural vibrations of an aircraft excited by wind blasts and buffeting on the aircraft in flight, the system comprising:

an inertial sensing system of the aircraft, said inertial sensing system determining roll rates of the aircraft and detecting disturbing parameters of exciting structural vibrations using said roll rates essentially determined by the inertial sensing system without requiring additional sensors;

a flight control system coupled with said inertial sensing system, said disturbing parameters being fed to said flight control system; and wherein said flight control system processes said disturbing parameters and generates appropriate control signals to produce phase- and amplitude-correct aircraft control flap movements for counteracting phases and amplitudes of the excited structural vibrations.

7. The system according to claim 6, further comprising a plurality of drive units operatively associated with respective aircraft control surfaces, said drive units receiving the respective appropriate control signals from the flight control system to correctly move the associated control surfaces to counteract the excited structural vibrations.

8. The system according to claim 6, wherein said inertial sensing system determines yaw rates of the aircraft, said yaw rates being additionally used to produce the appropriate control signals.

9. The system according to claim 6, wherein said inertial sensing system determines pitch rates of the aircraft, said pitch rates being additionally used to produce the appropriate control signals.

10. The system according to claim 9, wherein said inertial sensing system determines pitch rates of the aircraft, said pitch rates being additionally used to produce the appropriate control signals.

\* \* \* \* \*